(12) United States Patent
Bruggi et al.

(10) Patent No.: US 12,724,934 B2
(45) Date of Patent: Sep. 1, 2026

(54) COMPUTER IMPLEMENTED LIGHTWEIGHT DESIGN METHOD

(71) Applicant: POLITECNICO DI MILANO, Milan (IT)

(72) Inventors: Matteo Bruggi, Milan (IT); Ingrid Paoletti, Milan (IT)

(73) Assignee: POLITECNICO DI MILANO, Milan (IT)

( * ) Notice: Subject to any disclaimer, the term of this patent is extended or adjusted under 35 U.S.C. 154(b) by 1176 days.

(21) Appl. No.: 17/638,590

(22) PCT Filed: Oct. 7, 2020

(86) PCT No.: PCT/IB2020/059416
§ 371 (c)(1),
(2) Date: Feb. 25, 2022

(87) PCT Pub. No.: WO2021/070080
PCT Pub. Date: Apr. 15, 2021

(65) Prior Publication Data

US 2022/0327257 A1 Oct. 13, 2022

(30) Foreign Application Priority Data

Oct. 11, 2019 (IT) ........................ 102019000018539

(51) Int. Cl.
*G06F 30/17* (2020.01)
*B29C 64/386* (2017.01)
(Continued)

(52) U.S. Cl.
CPC ............ *G06F 30/17* (2020.01); *B29C 64/386* (2017.08); *B33Y 50/00* (2014.12); *G06F 30/23* (2020.01); *G06F 2113/10* (2020.01)

(58) Field of Classification Search
CPC ....... G06F 30/23; G06F 30/17; B29C 64/386; B33Y 50/00
See application file for complete search history.

(56) References Cited

U.S. PATENT DOCUMENTS

2017/0239064 A1* 8/2017 Cordaro ................. A61B 50/30

FOREIGN PATENT DOCUMENTS

EP 3 501 458 A1 6/2019

OTHER PUBLICATIONS

Ravikovitch, P. I., & Neimark, A. V. (2002). Density functional theory of adsorption in spherical cavities and pore size characterization of templated nanoporous silicas with cubic and three-dimensional hexagonal structures. Langmuir, 18(5), 1550-1560. (Year: 2002).*

(Continued)

*Primary Examiner* — Bijan Mapar
(74) *Attorney, Agent, or Firm* — ASLAN LAW, P.C.

(57) ABSTRACT

A computer implemented lightweight design method including: a preliminary homogenization step for defining a material model related to an adopted manufacturing material; a subsequent optimization step for finding an optimal distribution of material density within the design domain; and a final post-processing step to find the geometry for manufacturing; wherein the preliminary homogenization step is performed for deriving the material model for a 2D/3D version of a porous material provided with circular/spherical holes in a Hexagonal Close-Packed (HCP) arrangement, and the post-processing step comprises computing position and size of the circular/spherical holes.

5 Claims, 6 Drawing Sheets

(51) Int. Cl.
*B33Y 50/00* (2015.01)
*G06F 30/23* (2020.01)
*G06F 113/10* (2020.01)

(56) References Cited

OTHER PUBLICATIONS

Wang, Y., Arabnejad, S., Tanzer, M., & Pasini, D. (2018). Hip implant design with three-dimensional porous architecture of optimized graded density. Journal of Mechanical Design, 140(11). (Year: 2018).*

Yingjun Wang et al: "Hip Implant Design With Three-Dimensional Porous Architecture of Optimized Graded Density," Journal of Mechanical Design, vol. 140, No. 11, 7 Sep. 2018 pp. 1-13, XP055706403, US ISSN: 1050-0472, DOI: 10.1115/1.4041208.

Yuen-Shan Leung et al: "Challenges and Status on Design and Computation for Emerging Additive Manufacturing Technologies," Journal of Computing and Information Science in Engineering, vol. 19, No. 2, Mar. 18, 2019, XP055658891, US ISSN: 1530-9827, DOI: 10.1115/1.4041913.

Zong Hongming et al: "VCUT level set method for topology optimization of functionally graded cellular structures," Computer Methods in Applied Mechanics and Engineering, North-Holland, Amsterdam, NL, vol. 354, May 31, 2019, pp. 487-505, XP085737828, ISSN: 0045-7825, DOI: 10.1016/J.CMA.2019.05.029 [retrieved on May 31, 2019].

Nazir Aamer et al: "A state-of-the-art review on types, design, optimization, and additive manufacturing of cellular structures," The International Journal of Advanced Manufacturing Technology, Springer, London, vol. 104, No. 9-12, Jul. 10, 2019, pp. 3489-3510, XP036922692, ISSN: 0268-3768, DOI: 10.1007/S00170-019-04085-3 [retrieved on Jul. 10, 2019].

* cited by examiner data
SIMP
fit
$C_{11}/C_{11}^0$
0
0.2
0.4
0.6
0.8
1
0
0.25
0.5
0.75
1
ρ
data
SIMP
fit
$C_{33}/C_{33}^0$
0
0.2
0.4
0.6
0.8
0
0.25
0.5
0.75
1
ρ

COMPUTER IMPLEMENTED LIGHTWEIGHT DESIGN METHOD

CROSS-REFERENCE TO RELATED APPLICATIONS

This application claims priority to IT patent application No. 102019000018539 filed on Oct. 11, 2019, and this application claims priority to and is a 371 of international PCT Application No. PCT/IB2020/059416 filed on Oct. 7, 2020, the entire contents of which are hereby incorporated by reference.

TECHNICAL FIELD

The present invention relates to a computer implemented lightweight design method, particularly for fabrication with Additive Manufacturing (AM) techniques.

BACKGROUND ART

Topology optimization sketches lightweight components searching the design domain for the distribution of material that minimizes a prescribed objective function given a set of constraints.

Techniques such as additive manufacturing (AM) are well-suited to bring optimal layouts from concept to reality, since they considerably reduce restrictions imposed by traditional manufacturing techniques.

In a classical topology optimization problem, the constitutive properties of the material to be distributed are scaled by its point-wise density $0 \leq \rho \leq 1$, i.e. the minimization unknown, through an interpolation law. A strong penalization of the intermediate densities was especially conceived in the Solid Isotropic Material with Penalization (SIMP) to achieve optimal layouts made of void ("0" or "white") and solid material ("1" or "black"). The achieved solutions for minimum compliance mainly consist of statically determinate truss-like structures that leverage the axial stiffness of struts and ties to get minimum deformability out of a limited amount of material.

However, in case of distributed loads, undesired "grey" regions may arise in the achieved solutions. Similar issues may be encountered when multiple load cases are considered in the optimization. Intermediate values of the density have no physical meaning, unless composite materials are allowed within the optimization. Indeed, suitable periodic cells can be designed at the micro-scale to match the homogenized mechanical properties prescribed by the interpolation law when distributing material at the macro-scale.

Furthermore, it is known that multi-scale approaches of topology optimization take advantage of numerical homogenization to define both the boundaries (macro level) and the inner lattices (micro level) of the optimal solution. In general, the achieved microstructures are difficult to fabricate. When several patterns are generated a peculiar issue is that different patches cannot be easily merged altogether.

Loss of continuity or undesired geometrical singularities are likely to arise. When grading honeycombs, or lattice and surface-based representation with given topology, issues to be faced include handling of anisotropy (especially in 3D), potential weakness of the micro-structure due to any abrupt change in section and sharp connections, features exhibiting critical overhang angles. The latter point is crucial for printers that use Fused Deposition Modelling (FDM) to melt a plastic filament while positioning it layer-by-layer. At 45°, the newly printed layer is supported only by half of the previous layer, often still sufficient to build upon. For angles in excess of 45 degrees, support is generally required, at least for non-negligible "bridges". Increasing cooling while reducing speed should be considered, as well.

Furthermore, grading is not a trivial task from a computational point of view. Even in case of honeycombs, a procedure must be given to describe a geometry made of bar-like solids with 3D intersections and varying cross area.

DESCRIPTION OF THE INVENTION

The main aim of the present invention is to provide a computer implemented lightweight design method that allows to overcome the above-defined problems and weakness of the known solutions.

The above-mentioned objects are achieved by the present computer implemented lightweight design method according to the features of claim 1.

BRIEF DESCRIPTION OF THE DRAWINGS

Other characteristics and advantages of the present invention will become better evident from the description of a preferred, but not exclusive embodiment of a computer implemented lightweight design method, illustrated by way of an indicative but non-limiting example in the accompanying Figures, in which.

EMBODIMENTS THE INVENTION

According to the invention, the computer implemented lightweight design method of an object to be fabricated, comprises at least the following steps:

- obtain a material model related to an adopted manufacturing material;
- a subsequent optimization step 2 for finding an optimal distribution of material density within the design domain; and
- a final post-processing step 3 to find the geometry for manufacturing, particularly for 3D-printing.

Figure 1:
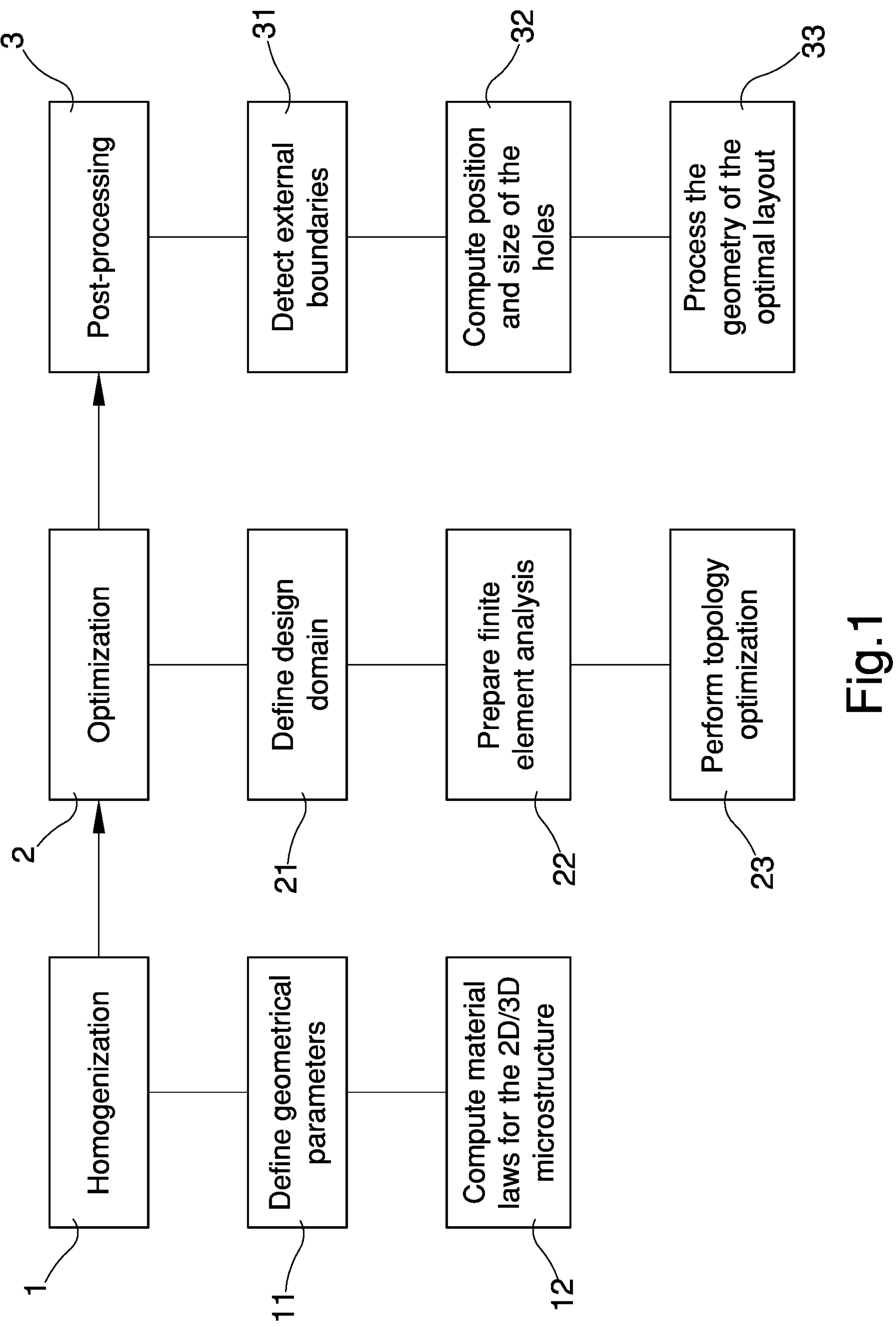
FIG. 1 shows a general flowchart of the computer implemented lightweight design method according to the invention.

A flowchart to exemplify the computer implemented method is given in FIG. 1.

Preferably, the computer implemented lightweight design method according to the invention is applied for fabrication of objects/components with Additive Manufacturing (AM) techniques.

Different applications with different fabrication methods are not excluded. Furthermore, as shown in the example of FIG. 1, the computer implemented method comprises a preliminary homogenization step 1 to define said material model.

Particularly, the preliminary homogenization step 1 is performed to derive the material model for the two-/three-dimensional (2D/3D) version of the porous material with circular/spherical holes in an HCP arrangement.

This preliminary homogenization step 1 is not needed, if material laws for the constituent material are already available from previous simulations.

The preliminary homogenization step 1 comprises a geometrical parameters definition sub-step 11 of a 2D or 3D porous microstructure of said porous material (step 11).

Particularly, the 2D/3D porous microstructure according to the invention comprises at least a single base cell comprising circular/spherical holes in a Hexagonal Close-Packed (HCP) arrangement.

Figure 2:
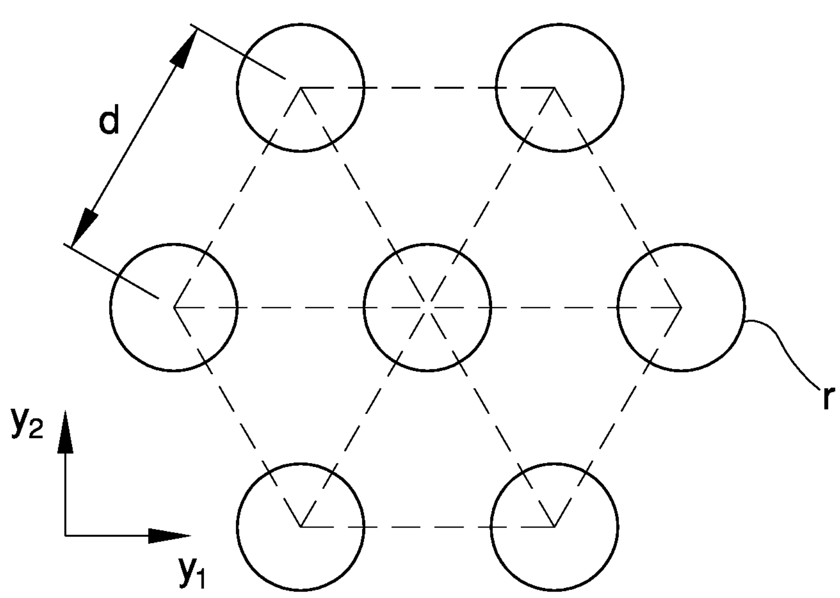
FIGS. 2 and 3 show a 2D version of a porous microstructure.
Figure 3:
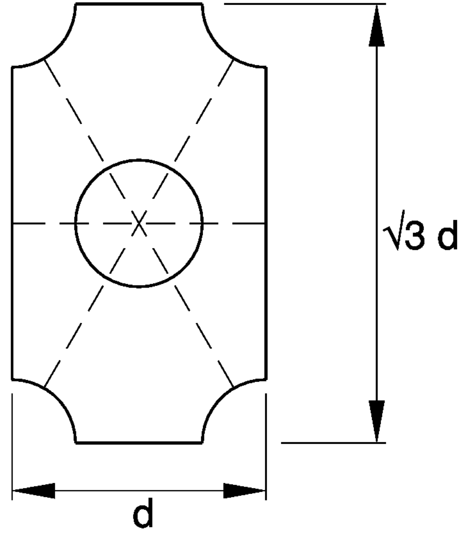
Figure 4:
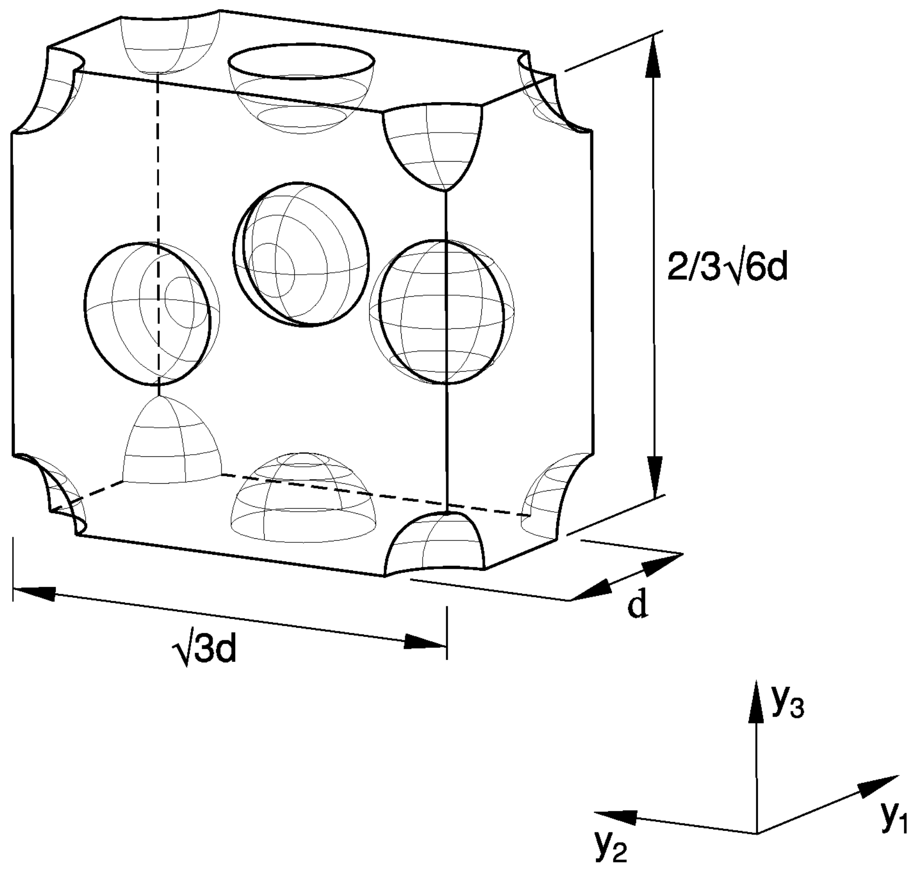
FIG. 4 shows a three-dimensional view of a single base cell in a 3D version of a porous microstructure.

FIGS. 2, 3 and FIG. 4 show the 2D/3D version respectively.

Particularly, FIG. 2 shows a hexagonal arrangement of circular holes, while FIG. 3 shows a single base cell.

FIG. 4 shows a three-dimensional view of a single base cell in a 3D version of the porous microstructure.

The geometrical parameters definition step 11 further comprises calculating the density of the 2D porous microstructure as a function of the radius r of said circular holes of the 2D porous microstructure, according to the following equation (Eqn. 1):

$$\rho = 1 - \frac{2\pi r^2}{\sqrt{3}\,d^2} \text{ for } 0 \le r \le r_{max}, \text{ with } r_{max} = \frac{d-t}{2}$$

wherein:

r is the radius of said circular holes;

d is a reference dimension of said porous microstructure;

t is the minimum thickness of the material between two adjacent holes.

With reference to 3D, the geometrical parameters definition step 11 comprises calculating the density of the 3D porous microstructure as a function of the radius r of said spherical holes of the 3D porous microstructure, according to the following equation (Eqn.2):

$$\rho = 1 - \frac{8\pi r^3}{3\sqrt{2}\,d^3} \text{ for } 0 \le r \le r_{max}, \text{ with } r_{max} = \frac{d-t}{2}$$

wherein:

r is the radius of said spherical holes;

d is a reference dimension of said porous microstructure;

t is the minimum thickness of the material between two adjacent holes.

Hence, the minimum density of the porous material that is feasible with the prescribed set of geometrical parameters reads:

$$\rho_{min} = 1 - \frac{\pi(d-t)^2}{2\sqrt{3}\,d^2} \text{ related to } 2D \text{ and} \quad \text{(Eqn. 3)}$$

$$\rho_{min} = 1 - \frac{\pi(d-t)^3}{3\sqrt{2}\,d^3} \text{ related to } 3D. \quad \text{(Eqn. 4)}$$

The preliminary homogenization step 1 further comprises computing material laws for said 2D/3D porous microstructure (if not already available) (step 12). Particularly, numerical homogenization is repeatedly performed on a discretized version of the relevant unit cell to compute the material law, i.e. the entries of the constitutive tensor of the homogenized material $C_{ijhk}$ written as a function of its density ρ.

To this end, a set of sampling points is considered in the range $0 \le r \le r_{max}$. Particularly, the step 12 of computing material laws for the 2D/3D porous microstructure comprises calculating a constitutive tensor of the homogenized material ($C_{ijhk}$) according to the following equation (Eqn.5):

$$C_{ijhk} = \frac{1}{|Y|}\int_Y E_{pqrs}\varepsilon_{pq}^{A(ij)}\varepsilon_{rs}^{A(hk)}dY$$

wherein:

$C_{ijhk}$ is said constitutive tensor of the homogenized material;

|Y| is the volume of said base cell;

$E_{pqrs}(E_0; v_0)$ is the constitutive tensor of the material used to manufacture the object;

$$\varepsilon_{pq}^{A(ij)}$$

is the strain field induced within the cell when enforcing unit test strains at its boundaries.

Particularly, the achieved results may be fitted using a fifth-degree polynomial, for which zero stiffness is additionally enforced at ρ=0.

Furthermore, according to a specific but not limiting example, the equation Eqn.5 is defined considering specific Young modulus $E_0$ and Poisson's ratio $v_0$ of the constitutive material used to manufacture the object.

As a result, with reference to the 2D version of the porous microstructure, which is isotropic, the homogenized constitutive tensor may be written in Voigt notation as follows (Eqn.6):

$$C = C_{11}\begin{bmatrix} 1 & 1 & 0 \\ 1 & 1 & 0 \\ 0 & 0 & 0 \end{bmatrix} + C_{33}\begin{bmatrix} 0 & -2 & 0 \\ -2 & 0 & 0 \\ 0 & 0 & 1 \end{bmatrix}$$

where $C_{11}(\rho)$ and $C_{33}(\rho)$ read (Eqn.7):

$$C_{11}=(1.4506\rho^5-2.2357\rho^4+1.1573\rho^3+0.5214\rho^2+0.1065\rho)C^0_{11}$$

$$C_{33}=(3.5322\rho^5-7.5798\rho^4+5.6944\rho^3+0.6874\rho^2+0.0405\rho)C^0_{33};$$

for $0 \le \rho \le 1$ and $$C_{11}^0 = \frac{E_0}{1-v_0^2},\ C_{33}^0 = \frac{E_0}{2(1+v_0)} \quad \text{(Eqn. 8)}$$

Figure 5:
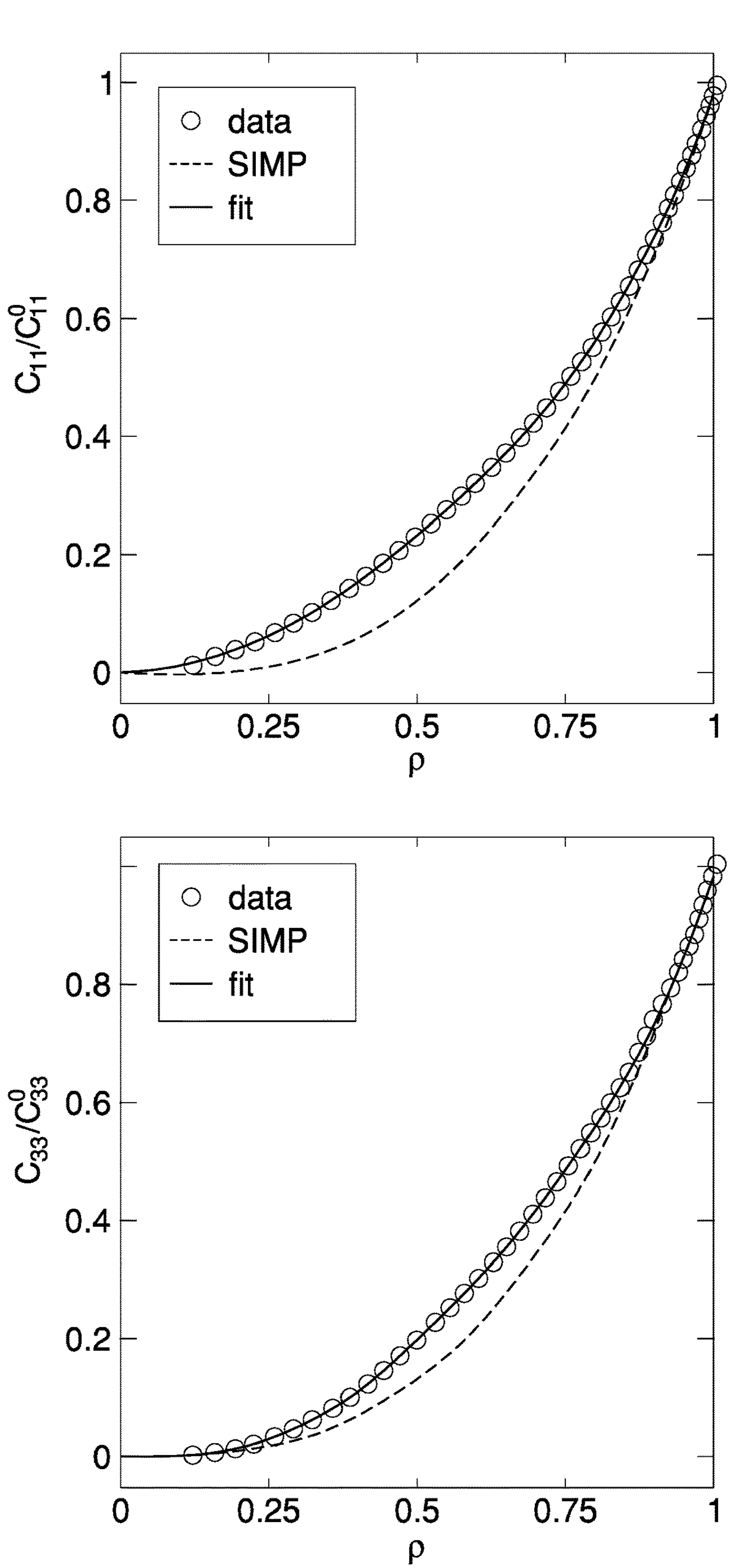
FIG. 5 shows an example of interpolation laws fitting results from numerical homogenization, as compared to a conventional SIMP, relating to the 2D version of a porous microstructure.

FIG. 5 plots results from the numerical homogenization performed on the 2D version of the porous microstructure for different material densities. The fitting interpolation laws are compared to the conventional SIMP to show that the porous microstructure is much stiffer at intermediate densities than the conventional penalization.

Furthermore, due to the low degree of anisotropy that is peculiar to the 3D version of the porous microstructure, its homogenized constitutive tensor can be reasonably written in Voigt notation as (Eqn.9):

$$C \approx C_{11}\begin{bmatrix} 1 & 1 & 1 & 0 & 0 & 0 \\ 1 & 1 & 1 & 0 & 0 & 0 \\ 1 & 1 & 1 & 0 & 0 & 0 \\ 0 & 0 & 0 & 0 & 0 & 0 \\ 0 & 0 & 0 & 0 & 0 & 0 \\ 0 & 0 & 0 & 0 & 0 & 0 \end{bmatrix} + C_{66}\begin{bmatrix} 0 & -2 & -2 & 0 & 0 & 0 \\ -2 & 0 & -2 & 0 & 0 & 0 \\ -2 & -2 & 0 & 0 & 0 & 0 \\ 0 & 0 & 0 & 1 & 0 & 0 \\ 0 & 0 & 0 & 0 & 1 & 0 \\ 0 & 0 & 0 & 0 & 0 & 1 \end{bmatrix}$$

where $C_{11}(\rho)$ and $C_{66}(\rho)$ read (Eqn.10):

$$C_{11}=(1.7075\rho^5-2.9452\rho^4+1.2826\rho^3+0.9011\rho^2+0.0540\rho)C^0_{11};$$

$$C_{66}=(1.5915\rho^5-3.0529\rho^4+1.3610\rho^3+1.0854\rho^2+0.0151\rho)C^0_{66};$$

for $0\leq\rho\leq1$ and $$C^0_{11} = \frac{E_0(1-\nu_0)}{(1+\nu_0)(1-2\nu_0)},\ C^0_{66} = \frac{E_0}{2(1+\nu_0)} \quad \text{(Eqn. 11)}$$

Figure 6:
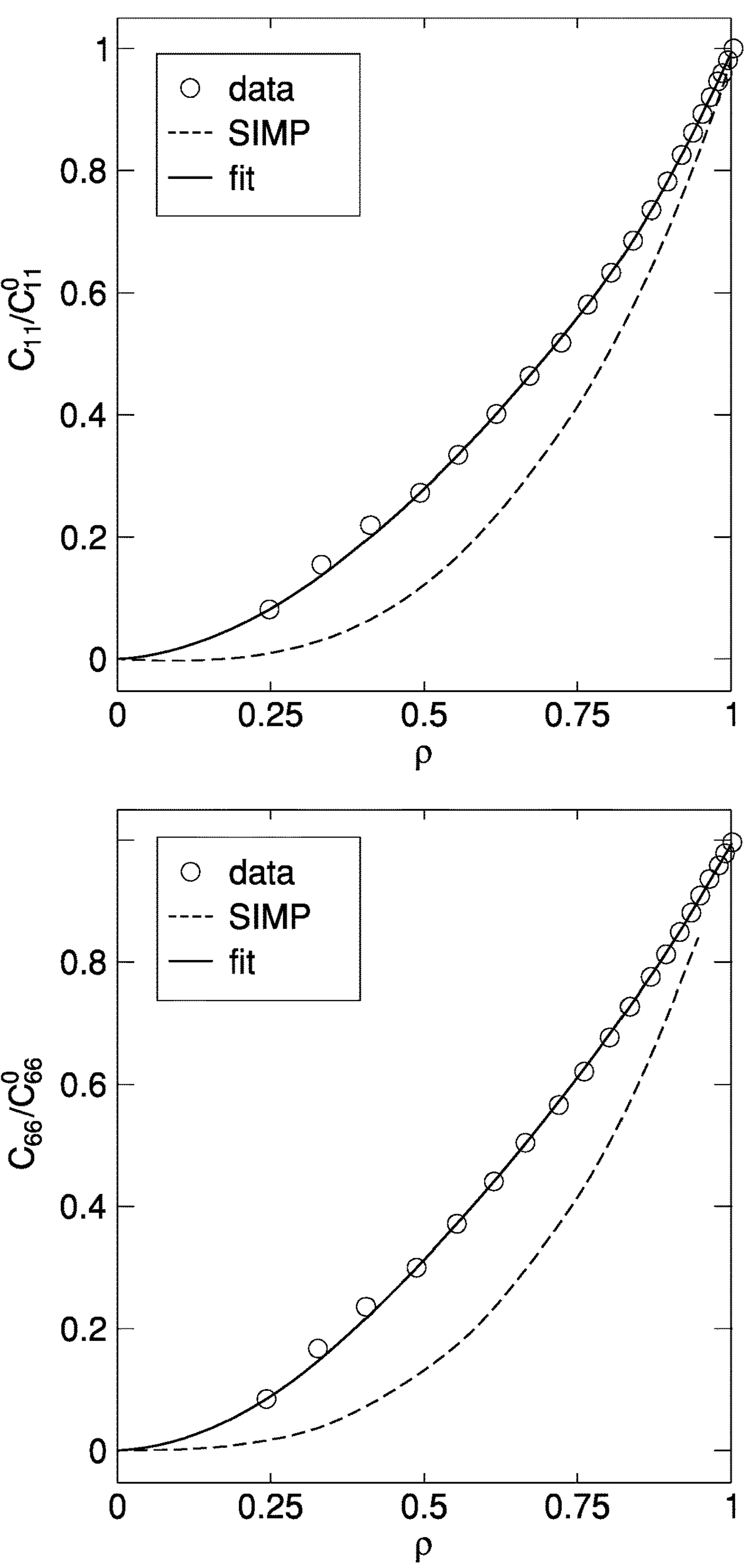
FIG. 6 shows an example of interpolation laws fitting results from numerical homogenization, as compared to a conventional SIMP, relating to the 3D version of a porous microstructure.

As an example, FIG. 6 reports results from the numerical homogenization performed on the 3D version of the porous microstructure for different material densities. The fitting interpolation laws for $C_{11}$ and $C_{66}$ are represented along with the conventional SIMP. Again, the porous microstructure is much stiffer at intermediate densities than the conventional penalization.

With reference to the optimization step 2 of the computer-implemented method according to the invention, it comprises a first sub-step 21 of defining design domain, boundary conditions and relevant finite element discretization (for example, pixel-/voxel-based discretization).

Particularly, the 2D/3D geometry of the design domain is provided by the user.

In case of a hollow object with fixed external boundaries, the design domain consists of the volume inscribed.

Boundary conditions are prescribed, i.e. loads and supports.

In view of the adoption of a regular finite element mesh with N square/cubic elements, a pixel-/voxel-based representation of the two-/three-dimensional design domain is adopted whenever possible.

In case of a design domain with complex geometry, an unstructured discretization is generated.

The optimization step 2 further comprises preparing finite element analysis for the solution of the state equation using reference element stiffness matrices for full material (step 22).

Particularly, a density unknown $x_e$, with $x_{min}\leq x_e\leq x_{max}$, $x_{min}\geq10^{-3}$ and $x_{max}\leq1$, is assigned to each element in the mesh.

Two reference element stiffness matrices are computed at the beginning of the procedure.

In 2D, $K^0_{11,e}$ and $K^0_{33,e}$ address the first and second term of the constitutive law in above equation Eqn.6 respectively, when using full material, i.e. $\rho=1$. According to a possible solution, with reference to said 2D porous microstructure, the step 22 of preparing finite element analysis comprises calculating the element stiffness matrices, for any prescribed value of density ($x_e$), according to the following equation (Eqn.12):

$$K_e(x_e) = \frac{C_{11}(x_e)}{C^0_{11}}K^0_{11,e} + \frac{C_{33}(x_e)}{C^0_{33}}K^0_{33,e}.$$

Particularly, Eqn.12 is determined entering Eqn.7 with $\rho=x_e$.

In 3D, $$K^0_{11,e} \text{ and } K^0_{66,e}$$

address the first and second term of the constitutive law in Eqn.9 respectively, when using full material, i.e. $\rho=1$.

According to a possible solution, with reference to said 3D porous microstructure, said step 22 of preparing finite element analysis comprises calculating said element stiffness matrices, for any prescribed value of density ($x_e$), according to the following equation (Eqn.13):

$$K_e(x_e) = \frac{C_{11}(x_e)}{C^0_{11}}K^0_{11,e} + \frac{C_{66}(x_e)}{C^0_{66}}K^0_{66,e}.$$

Particularly, Eqn.13 is determined entering Eqn.10 with $\rho=x_e$.

In case of an unstructured discretization, two reference element stiffness matrices are defined for each element in the mesh.

Furthermore, the optimization step 2 comprises the formulation of a topology optimization problem (step 23).

Particularly, the step 23 of topology optimization problem can be formulated according to the following equation (Eqn.14):

$$\begin{cases} \min\limits_{x_{min}\leq x_e\leq x_{max}} C = \sum_{e=1}^{N} U_e^T K_e(x_e) U_e & \text{(Eqn. 14.1)} \\ \text{s.t. } K(x)U = F, & \text{(Eqn. 14.2)} \\ \frac{1}{V}\sum\limits_{N} x_e V_e \leq V_f, & \text{(Eqn. 14.3)} \end{cases}$$

wherein

C is the structural compliance;

F is the load vector;

$U_e$ are the element-wise displacement vectors;

K(x) is the global stiffness matrix;

$K_e(x_e)$ are the element-wise contributions;

V is the volume of the whole design domain;

$V_e$, is the volume of the e-th element;

$V_f$ is a volume fraction.

Particularly, the objective function in Eqn.14.1 is the structural compliance C, that is a measure of the overall deformability of the object.

Eqn.14.2 enforces the elastic equilibrium for the load vector F and allows computing the element-wise displacement vectors $U_e$ (a subset of the nodal displacement vector U).

The global stiffness matrix K(x) gathers the element-wise contributions $K_e(x_e)$ of Eqn.12 and Eqn.13, in 2D and 3D respectively.

Eqn.14.3 requires that no more than a user-defined volume fraction $0<V_f<1$ is used in the design.

The volume of the e-th element is denoted by $V_e$, whereas V stands for the volume of the whole design domain.

With reference to Eqn.14, it is also pointed out that other objective functions can be considered (e.g. thermal or dynamical compliance), as well as constraints (e.g. stress-based and eigenvalue-based enforcements), adopting alternative formulations that exploit the basic concept of material distribution, including the distribution of multiple phases of material(s).

Eqn.14 can be solved using iterative update schemes of a known type.

At each iteration, the solution of the linear system in Eqn.14.2 allows computing the objective function and its sensitivities. For instance, the latter quantities are filtered using a convolution for a user-defined filter radius $r_f$.

The minimization unknowns are bounded from below by $x_{min}=10^{-3}$, if both the external boundaries and the inner microstructure are sought. In case of a hollow object with prescribed external boundaries, the optimal infill is sought for $x_{min}=\rho_{min}$, where $\mu_{min}$ is that of Eqn.3/Eqn.4 in 2D/3D.

In both cases, the upper bound of the element-wise densities can be user-defined. For $x_{max}=1$, regions of full materials are allowed in the optimal design. For $x_{max}<1$, a porous microstructure is enforced throughout the specimen.

As a result of the optimization step, a map of the distribution of the element-wise material densities $x_e$ is found throughout the design domain.

The post-processing step (3) comprises processing the map of the optimal distribution of the element-wise material densities $x_e$ for the detection of external boundaries of the object (if not given) (step 31).

Particularly, a cutoff value is defined, e.g. $\rho_{cut}=0.2$. The relevant iso-line/iso-surface is computed processing the map of the pixel-/voxel-based densities.

The region inscribed in the detected/assigned boundaries defines a surface or a solid, in 2D and 3D respectively.

Furthermore, the post-processing step 3 comprises computing position and size of said circular/spherical holes in a Hexagonal Close-Packed (HCP) arrangement within the body of the object while accounting for the printing technology (step 32).

Particularly, holes are allowed only within an inner offset of the edges of the final object, when the distance of the center from the external boundaries is not less than a user-defined value, e.g. $t_{off}=d$.

According to a possible solution, the step 32 of computing position and size of the holes comprises determining the coordinates $y_1$, $y_2$ and $y_3$ of the centers of the circular/spherical holes in the adopted HCP arrangement as follows (Eqn.15):

$$\left(i+\frac{1}{2}\mathrm{mod}(j+k,2)\right)d,$$

$$\left(\frac{\sqrt{3}}{2}j+\frac{1}{2\sqrt{3}}\mathrm{mod}(k,2)\right)d,$$

$$\left(\frac{\sqrt{6}}{3}k\right)d$$

wherein i, j and k are integer indices starting at the origin of a prescribed reference system, and wherein the operator mod returns the remainder after division of two terms.

For the h-th hole, the average density of the elements falling within a neighborhood of its center with diameter d is computed and denoted by $\rho_h$. Particularly, with reference to 2D, the step 32 of computing position and size of the holes comprises calculating the radius of a h-th circular hole according to the following equations:

if $\rho_h>\rho_{min}$ (where $\rho_{min}$ is that of Eqn.3), then $$r_h=\left(\frac{(1-\rho_h)\sqrt{3}}{2\pi}\right)^{\frac{1}{2}}d; \quad \text{(Eqn. 16)}$$

otherwise $r=r_{max}$ with $r_{max}=(d-t)/2$.

With reference to 3D, the step 32 of computing position and size of the holes comprises calculating the radius of a h-th spherical hole according to the following equations:

if $\rho_h>\rho_{min}$ (where $\rho_{min}$ is that of Eqn.4), then $$r_h=\left(\frac{(1-\rho_h)3\sqrt{2}}{8\pi}\right)^{\frac{1}{3}}d; \quad \text{(Eqn. 17)}$$

otherwise $r=r_{max}$ with $r_{max}=(d-t)/2$.

Finally, the post-processing step (3) comprises processing the geometry of the optimal layout for file exchange (step 33).

Particularly, Boolean subtraction of the geometrical entities representing the holes (circles or spheres, in 2D and 3D respectively, from step 32) from the geometrical entity representing the region within the optimal/given external boundaries of the layout (a surface or a solid, in 2D and 3D respectively, from step 31) is performed.

As an example, the graphical information can be exported using an IGES format.

Alternatively, a STL file format can be used.

A preliminary out-of-plane extrusion is needed in the 2D case.

Hence, a triangular representation of the involved three-dimensional surfaces (external boundaries of the object along with cylindrical/spherical holes in 2D/3D) is performed.

Figure 7:
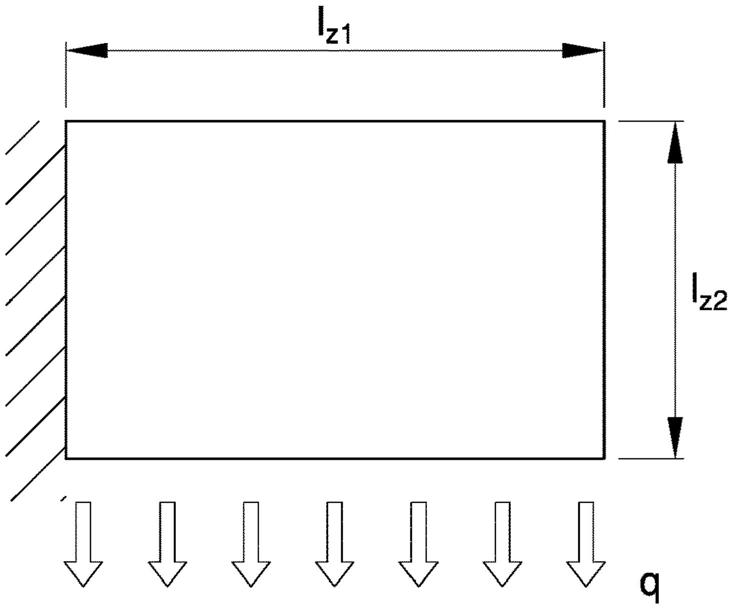
FIGS. 7 and 8 are related to an example of possible application of the computer implemented method according to the invention.

A possible numerical example is disclosed here below concerning to a cantilever, schematically represented in FIG. 7.

Geometrical and optimization parameters are assumed as it follows: $l_{z1}=320$ mm, $l_{z2}=200$ mm, $l_{z3}=10$ mm.

The cantilever is fully clamped along the left edge and is subject to a vertical distributed load $q=1$ N/mm$^2$ acting along the lower edge.

A mesh of N=64000 elements is used.

Figure 8:
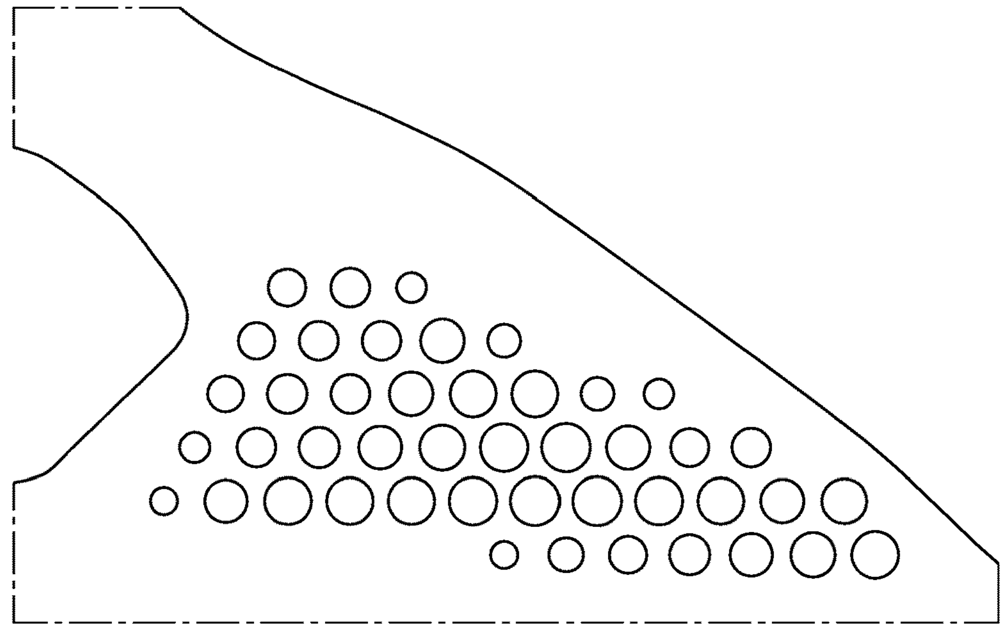

The optimization is performed using $x_{min}=10^{-3}$ and $x_{max}=1$, whereas $V_f=0.4$. FIG. 8 depicts results achieved for $d=l_{z1}/16$ and $t=d/10$.

Particularly, the choice of d and t mainly depends on the adopted manufacturing technology.

Another aspect of the invention relates to a data processing system comprising means for carrying out the steps of the method disclosed above for generating a 2D or 3D object and comprising also a 3D-printer for the fabrication of said object.

Therefore, the system according to the invention comprises all the hardware/software for generation and printing of lightweight objects/components. The hardware can be constituted by at least one elaboration unit provided with software implementing the above defined method, wherein the elaboration unit is connected to at least a 3D-printer.

Furthermore, according to another possible implementation of the invention, a 3D-printer directly comprises means for carrying out the steps of the method disclosed above.

Therefore, in this case the 3D-printer according to the invention incorporates all the hardware/software for generation and printing of lightweight objects/components.

In practice it has been found that the described invention achieves the proposed aims.

Particularly, the distinctive feature of the multiscale method according to the invention is the adoption of a graded porous microstructure made of circular/spherical holes, packed in an HCP (Hexagonal Close-Packed) arrangement.

This gives the following advantage over existing multiscale approaches.

The microstructure is ready for 3D-printing: circular/spherical holes are not affected by overhang issues (they can be printed at a reasonable quality without calling for additional printing supports or tricks such as reducing printing speed/temperature).

Furthermore, the porous microstructure has a smooth geometry: circular/spherical holes prevent geometrical singularities, such as sharp corners and intersections, to minimize structural weaknesses. No loss of continuity is allowed among adjacent cells.

The geometry of the graded microstructure is easy to compute, digitally handle and pass to the 3D-printer through an efficient procedure: once the reference dimension of the unit cell is defined, along with the minimum thickness of material between adjacent holes, centers and radii of circles/spheres are the only parameters involved in the description of the geometry.

The microstructure is isotropic (2D) or transversely isotropic with low degree of anisotropy (3D). From a computational point of view this means that: a few independent parameters are needed to describe the homogenized constitutive tensor; expressions giving tensor components as functions of the material density can be easily derived through numerical homogenization or data available from the literature; modification of SIMP-based codes to account for the proposed material models is straightforward. Moreover, from a mechanical point of view, this implies that a lightening of the full material is performed introducing a minimal anisotropy; robustness towards variation in the loads is expected.

The microstructure may be easily scaled depending on the printing technology by acting on the reference dimension of the base cell (that can be related to the thickness of the deposed layer of material).

The approach works both in 2D and 3D.

Furthermore, while the computer implemented method according to the invention mainly addresses FDM printers, other AM techniques that discard the need for support material, such as Selective Laser Sintering (SLS), can take full advantage of the method itself.

The following potential applications are considered.

Generation and fabrication of mechanical components: printing of original parts/lightened spares with optimized performance and robustness towards load variations (automotive and aerospace industries).

Generation and fabrication of massive structural components or massive technological components with structural function that need for lightening (building industry).

Generation and fabrication of design pieces through the definition of the optimal shape of the boundaries within a given design domain, along with a print-ready internal microstructure.

In general, solution to fabrication issues/printing issues encountered in the additive manufacturing of complex hollow objects, through the definition of an optimal perforated microstructure (infill) against critical overhangs and deformability/sagging issues.

The invention claimed is:

1. A method of manufacturing a lightweight object using an additive manufacturing system, the method comprising:

by a processor, performing a preliminary homogenization step to define a material model for a porous material provided with non-interconnected circular or spherical holes in a Hexagonal Close-Packed (HCP) arrangement;

by the processor, performing a subsequent optimization step to determine an optimal distribution of material density within a design domain of the lightweight object;

by the processor, performing a final post-processing step to generate a final geometry for the lightweight object, wherein the post-processing step comprises computing position and size of the circular or spherical holes based on the optimal distribution of material density; and fabricating, with the additive manufacturing system, the lightweight object according to the final geometry, wherein the fabricated object comprises a porous microstructure with said circular or spherical holes that are arranged to be self-supporting during fabrication, thereby reducing or eliminating a need for additional printing supports.

2. An additive manufacturing system for fabricating a lightweight object, the system comprising: a) a 3D-printer; b) a processor; and c) a memory storing instructions that, when executed by the processor, cause the system to:

perform a preliminary homogenization step to define a material model for a porous material provided with non-interconnected circular or spherical holes in a Hexagonal Close-Packed (HCP) arrangement;

perform a subsequent optimization step to determine an optimal distribution of material density within a design domain of the lightweight object;

perform a final post-processing step to generate a final geometry for the lightweight object, including computing the position and size of the circular or spherical holes based on the optimal distribution of material density; and control the 3D-printer to fabricate the lightweight object according to the final geometry, wherein the fabricated object comprises a porous microstructure with said circular or spherical holes that are arranged to be self-supporting during fabrication, thereby reducing or eliminating a need for additional printing supports.

3. The method of claim 1, wherein said step of computing position and size of the holes comprises:

with reference to 2D, calculating the radius of a h-th circular hole according to the following equations:

if $\rho_h > \rho_{min}$, then $$r_h = \left(\frac{(1-\rho_h)\sqrt{3}}{2\pi}\right)^{\frac{1}{2}} d;$$

otherwise $r = r_{max}$ with $r_{max} = (d-t)/2$, or with reference to 3D, calculating the radius of a h-th spherical hole according to the following equations:

if $\rho_h > \rho_{min}$, then $$r_h = \left(\frac{(1-\rho_h)3\sqrt{2}}{8\pi}\right)^{\frac{1}{3}} d;$$

otherwise $r=r_{max}$ with $r_{max}=(d-t)/2$, wherein $\rho_h$ is the average density of the elements falling within a neighborhood of its center with diameter d.

4. The method of claim 1, wherein said optimization step comprises the formulation of a topology optimization problem according to the following equation:

$$\begin{cases} \min\limits_{x_{min} \le x_e \le x_{max}} C = \sum_{e=1}^{N} U_e^T K_e(x_e) U_e & \text{(Eqn. 14.1)} \\ \text{s.t. } K(x)U = F, & \text{(Eqn. 14.2)} \\ \frac{1}{V}\sum_{N} x_e V_e \le V_f, & \text{(Eqn. 14.3)} \end{cases}$$

wherein

C is the structural compliance;

F is the load vector;

$U_e$ are the element-wise displacement vectors;

K(x) is the global stiffness matrix;

$K_e(x_e)$ are the element-wise contributions;

V is the volume of the whole design domain;

$V_e$, is the volume of the e-th element; and $V_f$ is a volume fraction.

5. The method of claim 1, wherein said preliminary homogenization step is performed for deriving the material model for a 2D/3D version of a porous material provided with non-interconnected circular/spherical holes in a Hexagonal Close-Packed (HCP) arrangement, wherein said preliminary homogenization step comprises a geometrical parameters definition step of said 2D/3D porous microstructure of the porous material, wherein said geometrical parameters definition step comprises:

calculating the density of said 2D porous microstructure as a function of the radius (r) of said circular holes of the 2D porous microstructure, according to the following equation:

$$\rho = 1 - \frac{2\pi r^2}{\sqrt{3}\, d^2} \text{ for } 0 \le r \le r_{max}, \text{ with } r_{max} = \frac{d-t}{2},$$

wherein r is the radius of said circular holes, d is a reference dimension of said porous microstructure, and t is the minimum thickness of the material between two adjacent holes; or calculating the density of said 3D porous microstructure as a function of the radius (r) of said spherical holes of the 3D porous microstructure, according to the following equation:

$$\rho = 1 - \frac{8\pi r^3}{3\sqrt{2}\, a^3} 0 \le r \le r_{max}, \text{ with } r_{max} = \frac{d-t}{2},$$

wherein r is the radius of said spherical holes, d is a reference dimension of said porous microstructure, and t is the minimum thickness of the material between two adjacent holes.

* * * * *